United States Patent Office 3,454,902
Patented July 8, 1969

3,454,902
CONTINUOUSLY TUNABLE PARAMETRIC OSCILLATOR
Joseph A. Giordmaine, Summit, N.J., assignor to Bell Telephone Laboratories, Incorporated, Murray Hill, N.J., a corporation of New York
Filed Apr. 1, 1968, Ser. No. 717,654
Int. Cl. H03b 5/18, 7/12
U.S. Cl. 331—96                                                              7 Claims

ABSTRACT OF THE DISCLOSURE

A continuously tunable parametric oscillator includes a parametric crystal disposed on the axis of a cavity resonator formed by a pair of spaced parallel diffraction gratings. When the frequency of maximum parametric gain is changed, as by applying heat or an electric field to the crystal, the angles to the resonator axis at which the signal and idler oscillations take place automatically change to satisfy the resonator mode equations. The use of diffraction gratings as the resonator reflectors creates modes which are resonant over a much broader band of frequencies than heretofore possible and thus effectively provides modes at an arbitrary pair of signal and idler frequencies. The same result in achieved through the use of a pair of concave diffraction gratings or a single planar grating and a right angle roof prism.

*Background of the invention*

This invention relates to parametric devices and more particularly to continuously tunable optical parametric oscillators.

It will be convenient hereinafter to discuss the invention with particular reference to electromagnetic waves of light frequencies, but it is to be understood that the principles are similarly applicable to longer wavelengths, such as wavelengths in the microwave range.

One of the major developments in the scientific world within the past decade has been the invention of the maser or laser which has made available to scientists and engineers for the first time a source of coherent electromagnetic radiation extending from microwave frequencies to the ultraviolet. From a technological standpoint, the real impact is yet to be fully realized.

While intense activity continues to be directed to the development and improvement of new masers and lasers, parallel development utilizing these new coherent sources and extending thir frequency ranges have also received considerable attention. One class of devices utilizes the nonlinear characteristics of materials transparent to the energy of concern to generate or amplify coherent radiation of a frequency different from that of the energizing source. Illustrative publications include Review of Modern Physics 35, 23 (1963), reporting second harmonic generation and Physical Review 127, 1918 (1962), directed to parametric effects.

The use of parametric effects with electromagnetic waves is analyzed in an article by P. K. Tien entitled, "Parametric Amplifier and Frequency Mixing in Propagating Circuits," Journal of Applied Physics 29, 1347 (1958), in which it is shown that traveling wave interaction and hence traveling wave parametric amplification or oscillation are possible if certain $\omega$–$\beta$ conditions are satisfied, where $\omega$ represents angular frequency and $\beta$ represents propagation constant. These conditions are that $$\omega_{signal} + \omega_{idler} = \omega_{pump} \quad (1)$$

and $$\bar{\beta}_{signal} + \bar{\beta}_{idler} = \bar{\beta}_{pump} \quad (2)$$

In U.S. Patent 3,234,475, issued on February 8, 1965 to applicant and D. A. Kleinman, there is disclosed the use of negative uniaxial crystals (e.g., KDP) having the property of birefringence to produce harmonic generation of coherent light. With proper choice of the direction through the crystal of the energizing light, the Tien $\omega$–$\beta$ conditions are satisfied so that the induced light may be made to add cumulatively in appropriate phase over an extended path (i.e., phase-match), and the output is a harmonic of the optical input energy. For the particular structure shown, only one harmonic is produced, as explained in that application, and the device is not tunable over a range of frequencies.

Numerous techniques devised to tune parametric devices have since been discovered, a few of which will be summarized here. Tuning by rotation of the cavity resonator mirrors in order to vary the angle between the pump and signal is disclosed in U.S. Patents 3,234,474 issued to A. Ashkin on Feb. 8, 1966, and 3,309,526 issued to applicant on Mar. 14, 1967. Tuning by rotation of a spherical nonlinear birefringent crystal so as to adjust the angle between the optic axis and the direction of wave propagation is taught by G. D. Boyd in U.S. Patent 3,201,709 issued on Aug. 17, 1965. Similarly, A. A. Ballman et al. teach in U.S. Patent 3,262,058, issued on July 19, 1966, tuning of a LiNbO$_3$ parametric oscillator by rotation of the crystal. Finally, applicant and R. C. Miller disclose in U.S. Patent 3,328,723, issued on June 27, 1967, that a parametric oscillator can be tuned by either varying the temperature of the crystal or by applying an electric field to the crystal, or by combining both operations.

None of the aforementioned parametric devices, however, is continuously tunable over a broad range of frequencies. Each device typically includes a cavity resonator formed by plane or curved mirrors. The use of mirrors dictates that only certain discrete modes can be sustained in the resonator. The wavelengths of these modes are given by the mode equation $$\lambda_n = 2l/n \quad (3)$$

where $\lambda_n$ is the wavelength of the $n$th mode, $l$ is the optical length of the resonator and $n$, a positive integer, is the mode number. The practical consequence of the existence of only discrete modes is that there is no guaranty that there will exist modes at an arbitrary pair of signal and idler frequencies. For example, although the signal frequency may be matched to a mode, the idler frequency may fall between two adjacent modes. Only by chance would both the signal and idler be matched to separate modes. Since both the signal and idler must be sustained to obtain parametric oscillations, the failure in this example of the idler to be mode-matched would result in the idler being seriously attenuated to the extent that parametric oscillation might not occur at all.

The problem of mode-matching is compounded in a tunable parametric device in which it is desired to vary the frequency of the output. Tuning a parametric oscillator involves first varying the frequency of maximum parametric gain (i.e., the frequency at which the crystal prefers to oscillate) as by varying the temperature of the crystal or by applying an electric field to the crystal. To sustain the new frequency oscillations, the modes of the resonator are then adjusted to match as closely as possible the signal and idler frequencies, each to a separate mode. As pointed out previously, because the prior art devices are characterized by discrete modes, there is no guaranty of a mode-match and hence no guaranty that parametric oscillations can be sustained at all, nor that optimum conditions can be achieved.

Summary of the invention

In an illustrative embodiment the parametric oscillator of the present invention includes a parametric crystal (i.e., one in which parametric oscillations can be generated) disposed on the axis of a cavity resonator formed in one instance by a pair of spaced parallel diffraction gratings disposed at an angle, preferably 45°, to the axis. The crystal could, for example, be a noncentrosymmetric birefringent negative-uniaxial crystal such as KDP, as disclosed in U.S. Patent 3,234,475, or could be an isotropic nonbirefringent crystal such as GaP as disclosed in U.S. Patent 3,309,526. In contrast to the discrete mode characteristics of the prior art devices, the invention is characterized by broadband modes, i.e., each mode is resonant over a broad range of frequencies with center frequency given by the wavelength defined by the mode equations:

$$2d \sin \alpha_i = N_i \lambda_i; \quad 2d \sin \alpha_s = N_s \lambda_s \quad (4)$$

and $$\lambda_i = \frac{2l}{n_i \cos \alpha_i}; \quad \lambda_s = \frac{2l}{n_s \cos \alpha_s} \quad (5)$$

where $d$ is the grating ruling spacing chosen generally so that the gratings have a high reflectivity at the center frequency of the tuning range, $\alpha$ is the angle which the oscillations make with the normal to the gratings, N is the grating order number, $\lambda$ is the wavelength of the oscillations, $l$ is the separation of the gratings, $n$ is the mode number, and the subscripts $i$ and $s$ designate the idler and signal, respectively. When the frequency of maximum parametric gain is changed (i.e., the crystal is tuned), one would expect that, as in prior art devices, the signal and idler would no longer be mode-matched inasmuch as the prior art modes are characteristically extremely narrow band (e.g., less than about 0.1 wave number). In the present invention, however, as previously mentioned, the modes are broadband and, therefore, within a broad tuning range (e.g., tens of wave numbers) the signal and idler both remain matched to their respective modes. This mode-matching effect is readily understood with reference to Equation 5. Consider an idler mode with $n_i$ fixed. As the crystal is tuned, $\lambda_i$ changes, and since $l$ is fixed, $\alpha_i$ changes to continue to satisfy Equation 5 and Equation 4 to a high degree of approximation. The invention is continuously tunable since the given modes $n_i$ and $n_s$ can oscillate (i.e., are resonant) over a broad range of signal and idler frequencies and not merely at a single discrete frequency characteristic of the prior art. The gratings are preferably disposed at an angle of 45° to the cavity resonator axis because at that angle the tuning range is broadest.

Continuous tuning is obtained not only by the use of a pair of parallel planar gratings but also by the use of either a pair of concave gratings or a planar grating and a right angle roof prism.

It should be noted that the use of diffraction gratings in the prior art has been limited primarily to frequency selection, not frequency broadening. That is, it is common to use a single diffraction grating disposed at an angle to the resonator axis in place of one of the mirrors of a conventional laser in order to obtain, by appropriate choice of the grating spacing, a single frequency output. The angle of the oscillations is fixed, however, because of the requirement that, in order to keep energy from reflecting out of the cavity, the oscillations must always be perpendicular to the mirror. In contrast, in the present invention the angle of the oscillations changes as the crystal is tuned, and the broadband modes created thereby provide continuous tuning in a parametric oscillator.

It should be further noted that, whereas the prior art teaches tuning by rotation of resonator mirrors, the diffraction gratings of the present invention need not be rotated in order to achieve adequate broadband tuning.

Brief description of the drawings

The invention, together with its various features and advantages, can be easily understood with reference to the accompanying drawings, in which.

Detailed description

Figure 1:
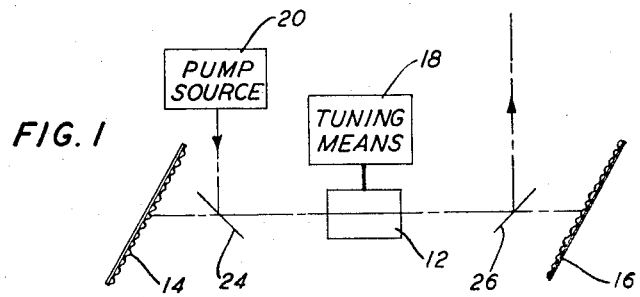
FIG. 1 is a schematic of an illustrative embodiment of the invention using plane parallel diffraction gratings.

Turning now to FIG. 1 there is shown an illustrative embodiment of a continuously tunable parametric oscillator comprising a parametric crystal 12 located on the axis of a cavity resonator formed by a pair of spaced parallel diffraction gratings 14 and 16 disposed at an angle to the resonator axis. Tuning means 18 is coupled to the crystal 12 for varying the frequency of maximum parametric gain of the crystal. For example, the means 18 might comprise means for applying an electric field or heat to the crystal, or means for rotating the crystal. A pump source 20 for providing oscillations at a first frequency, termed the pump frequency, is coupled to the resonator by a dielectric mirror 24 having high reflectivity at the pump frequency and negligible reflectivity throughout the signal and idler band. The pump produces oscillations at other frequencies, termed the signal and idler frequencies, which are extracted from the resonator by a second dielectric mirror 26 having characteristics similar to those of mirror 24. Other means well known in the art to couple energy to, and extract energy from, the resonator can, of course, be utilized.

Figure 2:
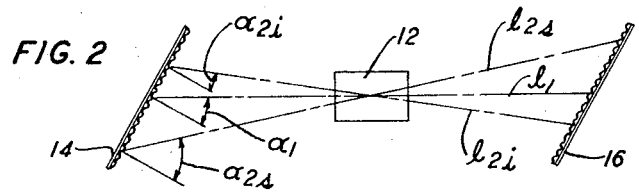
FIG. 2 is a schematic of an illustrative embodiment of the invention showing the separate angles which the signal and idler oscillations make with the gratings.

To understand the operation of the invention consider that initially the pump, signal and idler oscillations are collinear along the axis of the resonator. Initially, therefore, all oscillations as shown in FIG. 2 make an angle $\alpha_1$ with the diffraction gratings and exist over an optical length $l_1$. The idler and signal satisfy the mode Equations 4 and 5 with, for example, $\alpha_i = \alpha_s = \alpha_1$. When, however, it is desired to tune the oscillator, the frequency of maximum parametric gain is changed by tuning means 18 which in turn changes the idler and signal frequencies (i.e., $\lambda_i$ and $\lambda_s$) under the constraint of Equation 1. In order to satisfy the mode Equations 4 and 5 for particular fixed modes (i.e., $n_i$ and $n_s$ fixed), therefore, the idler and signal oscillations automatically change their respective angles $\alpha$. Thus, for example, the angle of the idler oscillations might change from $\alpha_1$ to $\alpha_{2i}$, whereas the signal oscillations might change from $\alpha_1$ to $\alpha_{2s}$, where $\alpha_{2i}$ and $\alpha_{2s}$ need not be equal. It is to be noted that the angles $\alpha$ shown in FIG. 2 have been exaggerated for the purposes of simplifying the illustration. The changes in $\alpha$ actually produce a change in the optical length $l/\cos \alpha$; that is, the signal now oscillates over a path length $l_{2s}=l/\cos \alpha_{2s}$ and the idler likewise oscillates over a path length $l_{2i}=l/\cos \alpha_{2i}$. Thus, the path length (i.e., the angle of the oscillations) and the wavelength change in such a manner that Equation 5 as well as Equation 4 remains satisfied to a high degree of approximation throughout the tuning range for the particular $n_i$ and $n_s$. Consider a numerical example applied to the equation $n=2L/\lambda$, where $L=l/\cos \alpha$. Let $n=10^4$ and initially let $L_1=10^2$ cm. $\lambda_1=2\times 10^{-2}$ cm. If the oscillator is tuned so that the wavelength is increased to $\lambda_2=1.1\lambda=2.2\times 10^{-2}$ cm., then for the oscillations to resonate in a fixed mode defined by $n=10^4$, the angle $\alpha$ of the oscillations must change ($l$ being fixed) so that the path length of the oscillations increases to $L_2=1.1L_1=1.1\times 10^2$ cm.

The net result is that the modes of the present invention are resonant over a broad range of frequencies. Consequently the invention is continuously tunable because even though the frequency of the oscillations is changed, those oscillations, both signal and idler, remain mode-matched. This property can be easily understood from the following comparison with the prior art.

Figure 3A:
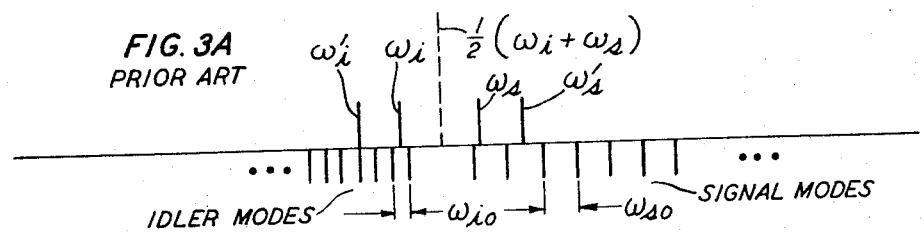
FIG. 3A shows the discrete signal and idler modes characteristic of prior art devices.

Consider FIG. 3A which depicts a frequency diagram characteristic of prior art parametric oscillations which have discrete idler and signal modes as shown, each idler mode being separated by an angular frequency $\omega_{io}$ and each signal frequency being separated by a frequency $\omega_{so}$, where $\omega_{io}=\pi c/\eta_i l$ and $\omega_{so}=\pi c/\eta_s l$, $c$ being the speed of light, $\eta$ the index of refraction in the crystal, and $l$ the optical length of the resonator. Initially, the signal and idler frequencies might be $\omega_s$ and $\omega_i$, as shown, with the average of the two frequencies $\frac{1}{2}(\omega_i+\omega_s)$, shown as a dotted line being fixed for all $\omega_s$ and $\omega_i$. Since $\omega_i$ and $\omega_s$ are not mode-matched (i.e., cavity modes are not available at both $\omega_i$ and $\omega_s$ simultaneously), the frequency of maximum parametric gain is therefore changed from $\omega_i$ and $\omega_s$ to $\omega'_i$ and $\omega'_s$, respectively. As so frequently happens, this technique matches $\omega'_i$ to a mode but fails to match simultaneously $\omega'_s$ to a mode. Mode matching in the prior art is therefore largely a hit and miss technique because the modes are discrete and the signal and idler frequencies cannot be independently varied.

Figure 3B:
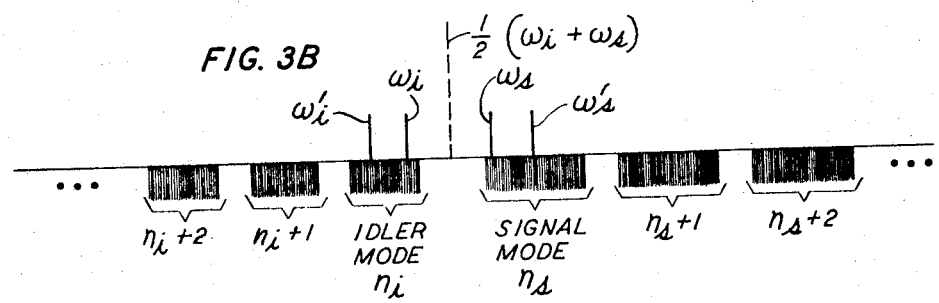
FIG. 3B shows the signal and idler modes characteristic of the present invention.

The present invention overcomes this difficulty by providing an extra degree of freedom; i.e., the angle of the oscillations as well as their frequency can be varied. The result, as previously described, is that each mode $n_i$ and $n_s$ is resonant over a broad range of frequencies as shown by the shaded area in FIG. 3B. The tuning range of each mode is shown to be equal for each mode, but in practice need not be so. Consequently, as the frequency of maximum parametric gain is changed, both $\omega_i$ and $\omega_s$ remain mode-matched within a broad tuning range, typically of the order to several tens of wave numbers. As shown in FIG. 3B, for example, as $\omega_i$ and $\omega_s$, both of which are mode-matched to modes $n_i$ and $n_s$ respectively, are tuned to $\omega'_i$ and $\omega'_s$, each remains mode-matched to modes $n_i$ and $n_s$. The limit on the tuning range arises from (1) the frequency gaps between the broadband modes in which mode-matching would not occur (this problem can be alleviated by properly choosing the length of the cavity resonator), and (2) the fact that tuning too broadly may cause the signal and idler to switch modes (e.g., to the $n_i+1$ and $n_s+1$ modes shown in FIG. 3B).

Figure 3C:
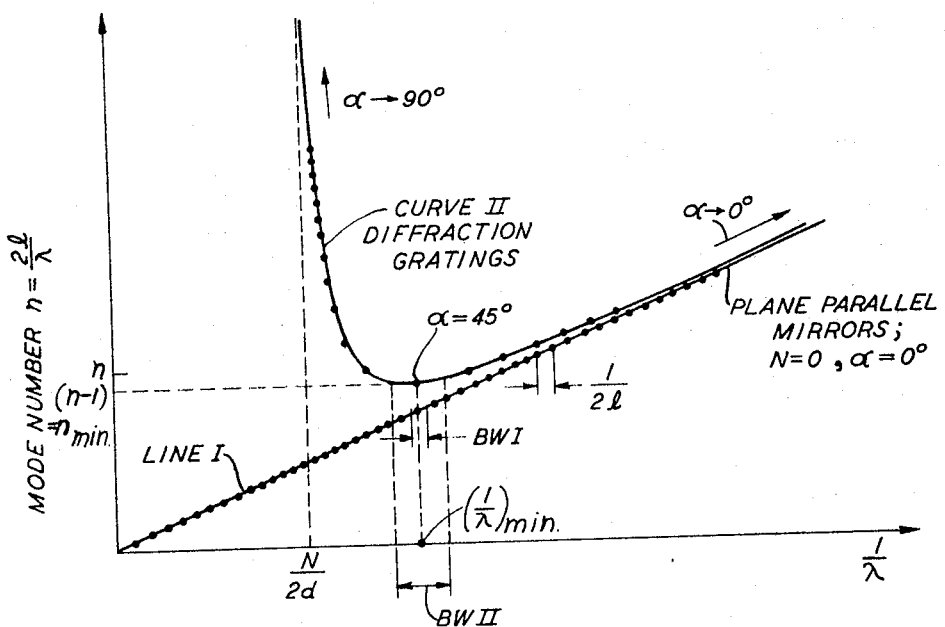
FIG. 3C is a graph of mode number versus inverse wavelength for both the invention and the prior art.

The extent of the tuning range can be readily understood with reference to FIG. 3C which is a graph of mode number versus inverse wavelength. Line I is a plot of the equation $$n=2l(1/\lambda) \qquad (6)$$

Corresponding to a resonator having plane parallel mirrors ($N=0$, $\alpha=0°$). Curve II is a plot of the simultaneous solution of Equations 4 and 5 for either the signal or the idler, and results in the following expression for a resonator having parallel diffraction gratings:

$$n=\frac{2l}{\sqrt{1-\left(\frac{N\lambda}{2d}\right)^2}}\left(\frac{1}{\lambda}\right) \qquad (7)$$

Each of the equations is plotted as if $n$ were a continuous variable, and the dots on the curves indicate the discrete values of $n$ corresponding to the mode numbers. On line I, corresponding to plane parallel mirrors, the mode spacing is constant and equal to $\frac{1}{2}l$. On curve II, corresponding to parallel diffraction gratings, the mode spacing varies with frequency. At frequencies $(1/\lambda)$ which approach $N/2d$, the mode spacing gets smaller and smaller and curve II approaches infinity. This condition corresponds to $\alpha \rightarrow 90°$. No modes exist, however, for $$1/\lambda < N/2d$$

for the grating cavity. As the frequency approaches infinity, the mode spacing again gets vanishingly small and curve II approaches line I asymptotically. This condition corresponds to $\alpha \rightarrow 0°$. At some frequency (i.e., some inverse wavelength $(1/\lambda)_{min}$ corresponding to $n_{min}$) curve II goes through a mathematical minimum, at which the mode spacing is a maximum. This condition corresponds to $\alpha=45°$. At $(1/\lambda)_{min}$ with $\alpha=45°$ a particular mode, designated arbitrarily as $(n-1)=n_{min}$, is resonant over a broad range of frequencies designated BW II. In this range the signal and idler frequencies can be tuned without mode switching occurring because the adjacent modes are spaced so far away typically a hundred wave numbers at optical frequencies. Of course, signal and idler frequencies may be resonant simultaneously near 45° by the use of two different order numbers $N_s$ and $N_i$ of the same grating. By contrast, at the same frequency, prior art devices using plane parallel mirrors would be tunable only over an extremely limited range BW I, typically a tenth of a wave number, because adjacent modes are very close (again, only a few tenths of a wave number apart). Thus in practice the ratio BW II:BW I may be of the order of 1000:1. It is clear, therefore, from FIG. 3C that the angle which the diffraction gratings make with the resonator axis is preferably set at about 45° so that the angle $\alpha$ of the oscillation is also in the neighborhood of 45°. In that way, the tuning range is maximized.

Figure 4:
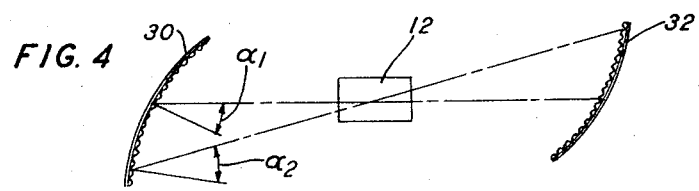
FIG. 4 is a schematic of an illustrative embodiment of the invention using concave diffraction gratings.
Figure 5:
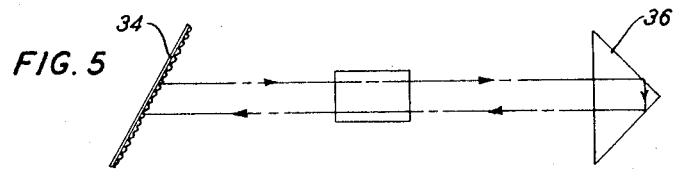
FIG. 5 is a schematic of an illustrative embodiment of the invention using a diffraction grating and a right angle roof prism.

Alternate means of forming the cavity resonator are shown in FIGS. 4 and 5. In FIG. 4 a pair of concave diffraction gratings 30 and 32 are utilized in place of the planar gratings of FIGS. 1 and 2. The concave gratings should preferably be geometrically congruous and, if spherical, should be such that radii, drawn from the point of intersection of the mirror and the axis, approximately are parallel. Concave gratings disposed as shown are termed "parallel" for the purpose of the description and claims of this invention. The concave gratings are also preferably disposed at an angle of 45° to the resonator axis; i.e., the tangent to the concave grating at the point of intersection of the grating and the axis makes an angle of 45° with the axis. In FIG. 5, on the other hand, one of the planar gratings is replaced by a right angle roof prism 36. The effect is the same as if two parallel planar gratings were used as long as the oscillations undergo an even number of reflections in the prism 36. This arrangement is to be contrasted with prior art frequency selection (not broadbanding) laser devices which utilize a diffraction grating and a mirror. The mirror in the prior art provides but one (an odd number) reflection and consequently the arrangement is equivalent to utilizing a pair of nonparallel planar gratings disposed as mirror-images of one another. Such a device is not continuously tunable.

Figure 6:
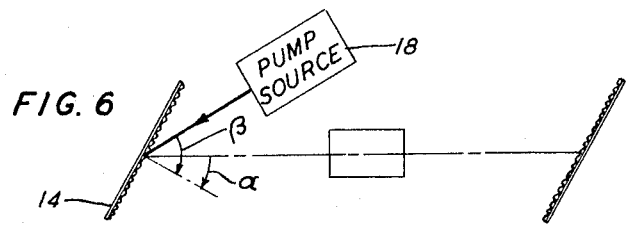
FIG. 6 is a schematic of an illustrative embodiment of the invention showing alternate means for coupling the pump source to the cavity.

It should be noted that the inherent characteristic of diffraction gratings, as contrasted with mirrors, allows the oscillations to be incident at an angle to the grating and yet be reflected back upon themselves rather than reflected out of the cavity. This property holds true as long as the mode Equations 4 and 5 are satisfied, and is utilized in FIG. 6 which shows alternate means of coupling the pump source 18 to the cavity. No partially reflecting coupling mirrors as used in FIG. 1 are required. Instead, the pump energy will be reflected along the cavity axis provided it is directed at an angle to the grating 14 such that the following relationship is satisfied:

$$d(\sin \beta + \sin \alpha) = N\lambda_p \qquad (8)$$

where $d$ is the diffraction grating spacing, $\beta$ is the angle which the incoming pump oscillations make with the normal to the grating, $\alpha$ is the angle which the grating makes with the cavity axis, N is the grating order number and $\lambda_p$ is the wavelength of the pump oscillations.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. An optical parametric device comprising in combination a cavity resonator formed by a pair of spaced reflectors at least one of which is a diffraction grating disposed at an angle to the axis of said resonator, a parametric crystal disposed on the axis of said resonator, means for introducing a beam of coherent light at a first frequency into said crystal to produce oscillations at other frequencies in said crystal, means for varying the frequencies of the output of said crystal by varying the angle which the oscillations at the other frequencies make with the resonator axis comprising means for changing the frequency of maximum parametric gain of said crystal, and means for providing egress of said oscillations at the other frequencies from said cavity resonator.

2. The device of claim 1 wherein said reflectors are both planar parallel diffraction gratings disposed at an angle to the axis of said resonator.

3. The device of claim 1 wherein said reflectors are both concave diffraction gratings.

4. The device of claim 1 wherein one of said reflectors is a diffraction grating and the other is a right angle roof prism disposed on the axis of said resonator so that oscillations incident upon the perpendicular faces of said prism are reflected along a path parallel to and non-collinear with incident oscillations.

5. The device of claim 1 wherein said grating is disposed at an angle of aproximately 45° to the axis of said resonator.

6. The device of claim 1 wherein said means for introducing a beam of coherent light at a first frequency into said crystal comprises a dielectric mirror disposed so as to reflect the beam along the axis of said resonator, said mirror having high reflectivity at the first frequency and negligible reflectivity at the other frequencies.

7. The device of claim 1 wherein said means for introducing a beam of coherent light at a first frequency into said crystal comprises means for directing the beam at an angle $\beta$ to said diffraction grating so as to satisfy the relationship $d(\sin \beta + \sin \alpha) = N\lambda$, where $d$ is the diffraction grating spacing, $\beta$ is the angle which the beam makes with the normal to said grating, $\alpha$ is the angle which the normal to said grating makes with the resonator axis, N is the grating order number and $\lambda$ is the wavelength of the beam of coherent light.

References Cited

UNITED STATES PATENTS

| | | | |
|---|---|---|---|
| 3,248,660 | 4/1966 | Fajans | 330—4.3 |
| 3,328,723 | 6/1967 | Giordmaine et al. | 331—107 |

ROY LAKE, *Primary Examiner.*

D. R. HOSTETTER, *Assistant Examiner.*

U.S. Cl. X.R.

307—88.3; 330—4.5; 331—107, 177